Dec. 20, 1960      L. E. FREY      2,964,778
CASTER
Filed Oct. 8, 1956
FIG. 1.
FIG. 2.
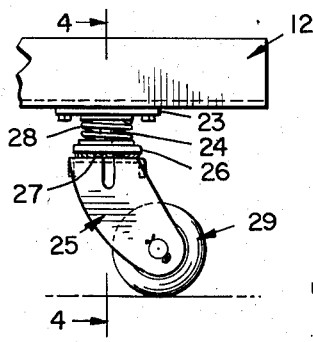
FIG. 3.
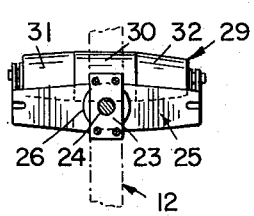
FIG. 4.
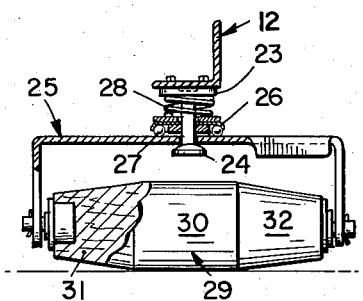
FIG. 5.
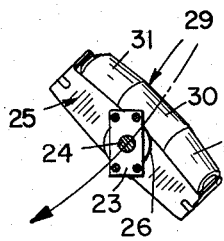
FIG. 6.
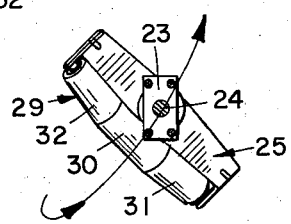
FIG. 7.
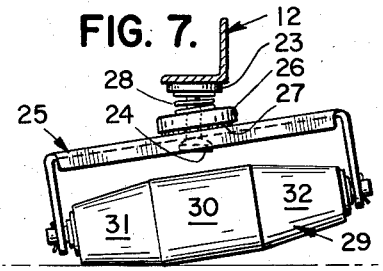
INVENTOR
LOUIS ELLIOTT FREY
BY
Robert C. Comstock
ATTORNEY United States Patent Office 2,964,778
Patented Dec. 20, 1960

2,964,778
CASTER

Louis Elliott Frey, Los Angeles, Calif., assignor to Duo-Bed Corporation, Los Angeles, Calif., a corporation of Nevada Filed Oct. 8, 1956, Ser. No. 614,474

3 Claims. (Cl. 16—21)

This invention relates to a new and improved type of caster. This application is a continuation-in-part of my application Serial No. 559,364, filed January 16, 1956 and now abandoned.

It is an object of my invention to provide a caster which is capable of facilitating movement of an object in any direction and which is particularly adapted for use in moving an object along an arcuate path. My caster is capable of distributing the weight of the object being moved across a substantial area to minimize the friction and wear resulting from the moving operation. This is particularly important where an object is repeatedly moved along a relatively fixed path on expensive floor covering such as carpeting or the lke, which normally results in excessive wear and damage to the floor covering.

While my caster is capable of use in moving any type of object, it is particularly useful for moving beds. Movement of a bed is desirable, for example, in sofa beds which are positioned along the wall of a room in the daytime to provide a sofa and which are adapted to be pivotally moved away from the wall for sleeping purposes. Movement of a bed is also desirable to permit making of the bed and to facilitate cleaning behind it. In this connection, while the casters now in use permit such movement, they often cause extreme wear on the carpets or rugs, particularly if the bed is moved along the same path day after day.

It is accordingly an object of my invention to provide a caster which is adapted to facilitate repeated movement of an object without any appreciable frictional damage or wear to the surface across which the object is moved.

It is particularly an object of my invention to provide a bed frame and caster construction therefor which is capable of repeated movement across a carpet without substantial wear or damage to the carpet due to distribution of the weight of the bed across a relatively wide area.

It should be noted that while my caster is particularly adapted to facilitate movement along a straight line or along any line whatsoever, the weight of the object being moved is always distributed across a relatively wide area, regardless of the direction of the movement.

In essence, my invention contemplates a caster having a roller which is swivelly mounted in a manner similar to a conventional caster. It is distinguished from the conventional caster, however, by reason of the fact that the roller is elongated and is provided with a straight portion which extends parallel to the surface across which the caster moves and at one or both of its ends with an adjacent tapered or somewhat frusto-conical end portion which normally extends at an acute angle with respect to the surface across which the caster moves. The roller is adapted to both swivel and also to tilt vertically with respect to the object which it carries in order to bring the appropriate portion of the roller into contact with the surface as the object is moved. Both the tilting and swiveling of the roller take place automatically in the same manner that the swiveling of a swivel caster ordinarily takes place upon movement of the object to which it is attached.

It is accordingly an object of my invention to provide a caster and bed frame construction having all of the advantages and benefits of the structure set forth above. My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings, Fig. 1 is a top plan view of a bed frame utilizing my casters, with the movement thereof indicated by arrows and dotted lines;

Fig. 2 is a side elevational view of my caster in use on a frame;

Fig. 3 is a top plan view of my caster in use on a frame;

Fig. 4 is a front elevational view of my caster in use on a frame, with parts shown in section;

Fig. 5 is a top plan view of my caster, showing the action of the roller upon movement in one direction;

Fig. 6 is a top plan view of my caster, showing the action of the roller upon movement in the opposite direction;

Fig. 7 is a front elevational view of my caster in use on a frame, showing the tilting of the roller.

A preferred embodiment which has been selected to illustrate my invention comprises a frame 12, which may represent a bed frame, dolly or other type of supporting member or object which is to utilize my caster. One or more of my casters may be mounted beneath the frame 12. Fig. 1 of the drawings, for example, shows one caster mounted beneath each corner of the frame 12.

Each of my casters includes a mounting plate 23 which is suitably attached to the bottom of the frame 12. Extending downwardly from the mounting plate 23 is a shaft 24, which extends through an opening in the top of a U-shaped swivel bracket 25. The end of the shaft 24 which is disposed beneath the top of the swivel bracket 25 is enlarged and rounded to permit angular movement of the swivel bracket 25 with respect to the shaft 24.

A race 26 contains a plurality of ball bearings 27, the lower portions of which bear against the top of the swivel bracket 25. A coil spring 28 is mounted so that its upper end bears against the lower portion of the mounting plate 23, with its lower end bearing against the top of the race 26.

An elongated roller 29 which may be formed of wood, rubber, plastic, or other suitable material, is mounted with its ends rotatably journaled in the lower end portions of the legs of the swivel bracket 25. Each of the rollers 29 is provided with a central straight portion 30 and a pair of frusto-conical end portions 31 and 32, which are oppositely directed from each other.

If the frame 12 is moved in a straight line, the rollers 29 will align themselves so that their axes are disposed transversely to the direction of movement, with the straight portions 30 engaging the floor. The rollers 29 will be disposed on the side of the swivel brackets 25 which is opposite from the direction of movement so that the rollers 29 follow the swivel brackets 25. It will be noted that the swivel brackets 25 are offset laterally with respect to the rollers 29. The result is that the device functions in the same manner as a conventional swivel caster, with the swivel brackets 25 automatically moving toward the direction of movement.

If the frame 12 is moved along an arcuate path, the axes of the rollers 29 will align themselves so that they point toward the axis of rotation. Upon such movement, the end of the roller 29 which is disposed toward the axis of rotation will be tilted downwardly to bring one of the frusto-conical portions 31 or 32 into engagement with the floor. As shown in Fig. 7 of the drawing, the entire swivel bracket assembly tilts against the pressure of the coil spring 28.

If the frame 12 is moved along the reverse arcuate path, the swivel brackets 25 and rollers 29 will reverse their positions in all particulars. The rollers 29 will then dispose themselves on the opposite side of the swivel brackets 25 and the rollers 29 will tilt in the same direction to bring the opposite frusto-conical portion 31 or 32 into engagement with the floor.

It will be noted that regardless of the direction or type of movement imposed upon the frame 12, the roller 29 always provides a broad and substantially friction-free floor engaging surface. In particular, it may be noted that the circumferences of the frusto-conical portions 31 and 32 adjoining the straight portion 30 are greater than the circumferences of their outer ends. When the roller 29 aligns itself for arcuate movement, the end of the frusto-conical portion 31 or 32 which is remote from the pivot point is larger to compensate for its increased length of movement. My caster thus avoids any frictional drag during such movement.

I claim:

1. A caster including a mounting plate adapted to be attached to an object, a shaft extending downwardly from said mounting plate, a substantially U-shaped elongated swivel bracket disposed beneath said mounting plate, said swivel bracket having a horizontally extending top and a pair of downwardly directed arms at the ends thereof, said top having a hole therein, said shaft extending through said hole, an enlargement carried by the lower end of said shaft, said enlargement having an arcuate upper surface engaging the under surface of the top of said swivel bracket surrounding said hole to provide a rotatable and tiltable mounting of said swivel bracket on said shaft, a race mounted on the top of said swivel bracket surrounding said shaft, a plurality of ball bearings mounted within said race, the lower portions of said ball bearings engaging the top of said swivel bracket, a coil spring surrounding said shaft, the upper end of said coil spring bearing against said mounting plate and the lower end of said coil spring bearing against said race, an elongated roller rotatably journaled at its opposite ends on the downwardly directed arms of said swivel bracket, said roller extending substantially parallel to the top of said swivel bracket and being laterally offset with respect to the top of said swivel bracket, said roller having a straight portion adjacent the center thereof, said roller having a pair of substantially frusto-conical portions extending from the ends of said straight portion to the ends of said roller, each of said frusto-conical portions being substantially equal in area to said straight portion, said swivel bracket and roller being adapted to automatically swivel with respect to said mounting plate upon movement of said object and to automatically tilt with respect to said mounting plate against the pressure of said coil spring upon arcuate movement of said object.

2. A caster including a mounting plate adapted to be attached to an object, a shaft extending downwardly from said mounting plate, a substantially U-shaped elongated swivel bracket disposed beneath said mounting plate, said swivel bracket having a horizontally extending top and a pair of downwardly directed arms at the ends thereof, said top having a hole therein, said shaft extending through said hole, an enlargement carried by the lower end of said shaft and engaging the under surface of the top of said swivel bracket surrounding said hole to provide a rotatable and tiltable mounting of said swivel bracket on said shaft, a race mounted on the top of said swivel bracket surrounding said shaft, a plurality of ball bearings mounted within said race, the lower portions of said ball bearings engaging the top of said swivel bracket, a coil spring surrounding said shaft, the upper end of said coil spring bearing against said mounting plate and the lower end of said coil spring bearing against said race, an elongated roller rotatably journaled at its opposite ends on the downwardly directed arms of said swivel bracket, said roller extending substantially parallel to the top of said swivel bracket and being laterally offset with respect to the top of said swivel bracket, the center of said roller having a larger diameter than the ends thereof, said swivel bracket and roller being adapted to automatically swivel with respect to said mounting plate upon movement of said object and to automatically tilt with respect to said mounting plate against the pressure of said coil spring upon arcuate movement of said object.

3. A caster including a mounting plate adapted to be attached to an object, a shaft extending downwardly from said mounting plate, an elongated substantially U-shaped swivel bracket, said swivel bracket having a horizontally extending top and a pair of downwardly directed arms at the ends thereof, said swivel bracket being rotatably and tiltably mounted on said shaft, a coil spring surrounding said shaft, the upper end of said coil spring bearing against said mounting plate and the lower end of said coil spring bearing against said swivel bracket, an elongated roller rotatably journaled at its opposite ends on the downwardly directed arms of said swivel bracket, said roller extending substantially parallel to the top of said swivel bracket and being laterally offset with respect to the top of said swivel bracket, the center of said roller having a larger diameter than the ends thereof, and means for mounting said swivel bracket and roller with respect to an object so that said swivel bracket and roller are capable of automatic vertical tilting movement with respect to said object against the pressure of said coil spring upon the arcuate movement of said object.

References Cited in the file of this patent

UNITED STATES PATENTS

| | | |
|---|---|---|
| 475,136 | Moran | May 17, 1892 |
| 1,052,454 | Blevney | Feb. 11, 1913 |
| 1,162,627 | McAllister | Nov. 30, 1915 |
| 1,247,827 | Hansen | Nov. 27, 1917 |
| 1,435,371 | Bartlett et al. | Nov. 14, 1922 |
| 1,649,529 | Herold | Nov. 15, 1927 |
| 1,745,992 | Herold | Feb. 4, 1930 |
| 2,532,806 | Gifford | Dec. 5, 1950 |
| 2,721,668 | Elsner | Oct. 25, 1955 |